(No Model.)

S. S. ARNOLD.
AXLE BEARING.

No. 481,545. Patented Aug. 30, 1892.

Witnesses.
F. R. Cameron
John E. Cameron

Inventor:
Samuel S. Arnold.
by Donald C. Ridout & Co.
Attys.

UNITED STATES PATENT OFFICE.

SAMUEL S. ARNOLD, OF TORONTO, CANADA.

AXLE-BEARING.

SPECIFICATION forming part of Letters Patent No. 481,545, dated August 30, 1892.

Application filed November 23, 1891. Serial No. 412,821. (No model.)

*To all whom it may concern:*

Be it known that I, SAMUEL STEPHEN ARNOLD, of the city of Toronto, in the county of York, in the Province of Ontario, Canada, have invented certain new and useful Improvements in Axle-Bearings, of which the following is a specification.

The object of this invention is to improve the device shown in my previous patent, No. 461,728, to render the same easier of adjustment.

In the construction shown in my aforesaid patent it often happens that when the jam-nut comes in contact with the cone-nut the turning of the one causes the other to turn also, thus making the bearing too tight.

To avoid this is the object of my present invention, which consists in the insertion between the nut and the jam-nut of a non-turning washer, as hereinafter more particularly described, and then definitely claimed.

Figure 1:
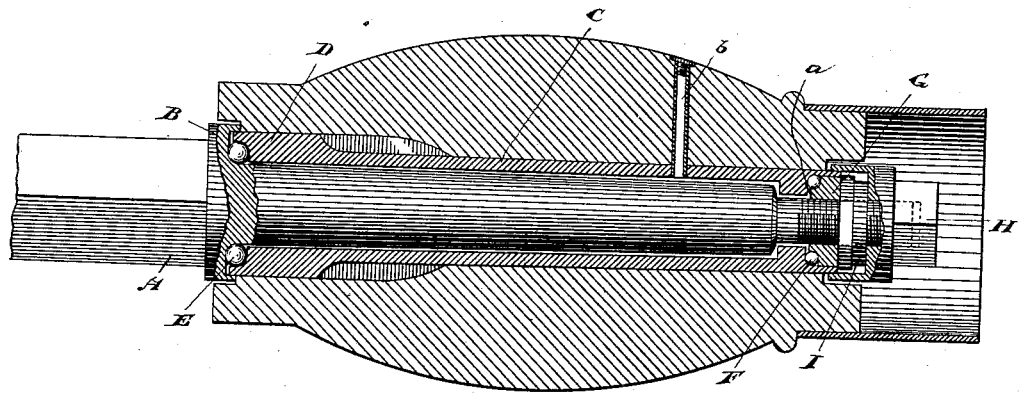
Figure 2:
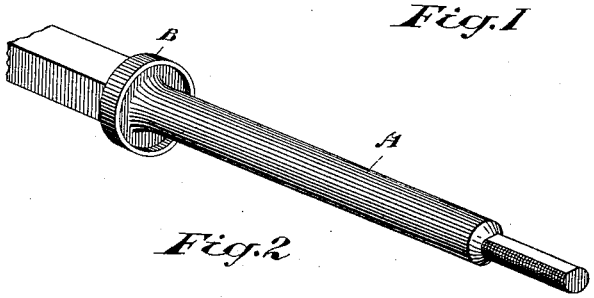
Figure 3:
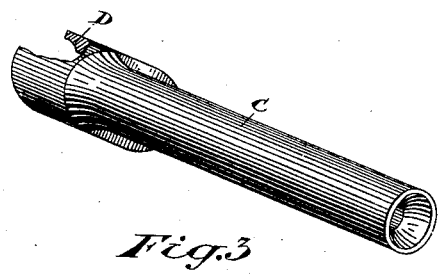
Figure 4:
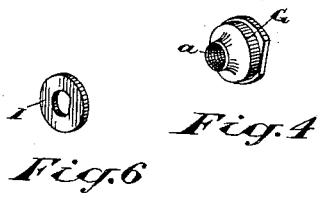
Figure 6:
Figure 5:
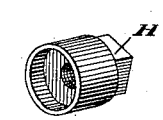

Figure 1 is a sectional view having my improved axle applied to the hub of an ordinary vehicle. Fig. 2 is a perspective detail of my improved axle. Fig. 3 is a perspective detail of the journal-box. Fig. 4 is a perspective detail of the inner nut. Fig. 5 is a perspective view of the outer nut. Fig. 6 is a detail of washer.

The object of my invention is to produce as nearly as possible an absolutely frictionless axle-bearing, which will remain lubricated for an indefinite period without requiring any personal attention; and in carrying out my invention all the details necessary to accomplish the desired end have been carefully attended to.

In the drawings, A represents an axle, on which a collar B is formed. The inner face of this collar is cupped or recessed.

C is a journal-box loosely fitted on the axle A and having a hub D, formed on its inner end, designed to fit into a cupped or recessed collar B. The inner face of the hub D is cupped or recessed to receive the hard balls E, a sufficient number of said balls E being provided to fill the annular recess formed around the axle by the cupped or recessed hub D. The outer end of the journal-box C is cupped, so as to form an annular recess, which is filled with hard balls F. These balls F are held in place by the cupped nut G, which is screwed onto the end of the axle A into the recess formed on the end of the journal-box C.

It will be noticed that a projection *a* is formed on the inner face of the nut G, which projection is intended to protect the screw on the end of the axle A and complete the annular recess in which the hard balls F are contained. The journal-box C is bored larger than the axle A, so that there will be a space between the said axle and the inside of the journal-box C when the said journal-box is supported by the hard balls E and F. This space forms a reservoir for the oil or other lubricant required for the hard balls E and F and will hold sufficient to lubricate the ball-bearings for an indefinite period.

*b* is an oil-passage through which the lubricant may be poured into the space around the axle. This oil-passage is of course kept closed by a proper stopper.

As before stated, the hub D on the journal-box C fits into the cupped collar B, which collar forms a cap to prevent sand and dirt from entering the annular recess containing the balls E. With a view of providing similar protection for the annular recess containing the hard balls F, I screw a cap H onto the end of the axle A, the said cap overlapping the end of the journal-box C, while the head of the cap butts against the washer I. This washer is placed between the cap H and the nut G in order that the revolving of the cap H will not cause the nut G to move.

On reference to Fig. 2 it will be observed that the screwed end of the axle A is flattened on one side, the hole in the washer being similarly formed, so that when the washer is placed on the screwed end of the axle A it will not revolve. Consequently when the cap H is screwed down against the washer I it will jam the said washer against the nut G, so as to lock the said nut, the stationary washer I effectually preventing the motion of the cap H from being transmitted to the nut G. It will be understood that were it not for the stationary washer I the screwing of the cap H when in contact with the nut G would revolve the said nut and cause it to jam the balls F, thereby destroying their usefulness.

From this description it will be seen that I produce an axle-bearing which is practically frictionless, the entire weight of the load being supported by the hard balls referred to and loosely arranged in the recesses in such a manner that they will revolve freely and independently during the revolving of the wheel or axle.

What I claim as my invention is—

A journal-box having its end cut, a nut screwed onto the axle of the said journal-box and cut to form with the cupped end of the journal-box an annular recess for the reception of hard balls by which the end of the journal-box is supported, a washer fitting onto the screwed end of the axle, so that it cannot revolve thereon, and a nut or cap designed to jam the washer against the inner cupped nut, substantially as and for the purpose specified.

Toronto, September 10, 1891.

SAMUEL S. ARNOLD.

In presence of—
S. W. McKEOWN,
I. EDW. MAYBEE.